(12) United States Patent
Liu et al.

(10) Patent No.: US 10,296,353 B2
(45) Date of Patent: May 21, 2019

(54) PROTECTING BASIC INPUT/OUTPUT (BIOS) CODE

(71) Applicant: Hewlett-Packard Development Company, L.P., Houston, TX (US)

(72) Inventors: Wei Ze Liu, Houston, TX (US); Jeffrey Kevin Jeansonne, Houston, TX (US); Dallas M Barlow, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/749,468

(22) PCT Filed: Jan. 25, 2016

(86) PCT No.: PCT/US2016/014774
§ 371 (c)(1),
(2) Date: Jan. 31, 2018

(87) PCT Pub. No.: WO2017/131621
PCT Pub. Date: Aug. 3, 2017

(65) Prior Publication Data
US 2018/0321947 A1 Nov. 8, 2018

(51) Int. Cl.
*G06F 9/4401* (2018.01)
*G06F 21/57* (2013.01)
(Continued)

(52) U.S. Cl.
CPC ............ *G06F 9/4401* (2013.01); *G06F 21/52* (2013.01); *G06F 21/554* (2013.01);
(Continued)

(58) Field of Classification Search
CPC ...... G06F 9/4401; G06F 21/572; G06F 21/52; G06F 21/554; G06F 21/575; G06F 2221/2101; G06F 2221/2151
See application file for complete search history.

(56) References Cited

U.S. PATENT DOCUMENTS 6,081,890 A * 6/2000 Datta ................... G06F 9/4401
703/27
6,122,732 A 9/2000 Ahuja
(Continued)

FOREIGN PATENT DOCUMENTS

WO WO-0227444 A2 4/2002
WO WO-2014175864 A1 10/2014

OTHER PUBLICATIONS

The International Searching Authority, "The International Search Report and The Written Opinion, Application No. PCT/US2016/014774", dated Sep. 12, 2016, 12 pages.

*Primary Examiner* — Austin Hicks
(74) *Attorney, Agent, or Firm* — HPI Patent Department (57) ABSTRACT

A method of protecting basic input/output system (BIOS) code. The method includes, with a relocation information tool executed by a processor, refactoring a number of data sections within a number of handlers of the BIOS code to tag a number of variables within the handlers. The tags indicate which of the variables should be protected at runtime. The method further includes generating a relocation file comprising a number of relocation addresses identifying locations of a number of dynamic variables that change at runtime. The relocation addresses point to a location within the handlers different from an original location. The method further includes, with a loader, loading at runtime the relocation file as part of a BIOS firmware image and adjusting data access to the dynamic variables in handler code to identify the location of the dynamic variables based on the relocation file.

16 Claims, 7 Drawing Sheets

(51) Int. Cl.
*G06F 21/52* (2013.01)
*G06F 21/55* (2013.01)

(52) U.S. Cl.
CPC .......... *G06F 21/572* (2013.01); *G06F 21/575* (2013.01); *G06F 2221/2101* (2013.01); *G06F 2221/2151* (2013.01)

(56) References Cited

U.S. PATENT DOCUMENTS

| | | |
|---|---|---|
| 2004/0064712 A1* | 4/2004 | Arthur .................... G06F 21/10 713/193 |
| 2007/0079094 A1 | 4/2007 | Wang |
| 2007/0214349 A1* | 9/2007 | Gu ........................ G06F 1/3203 713/2 |
| 2008/0222449 A1 | 9/2008 | Ramgarajan et al. |
| 2009/0254313 A1 | 10/2009 | Armour et al. |
| 2011/0078408 A1 | 3/2011 | Ishida et al. |
| 2013/0013905 A1 | 1/2013 | Held et al. |

* cited by examiner

PROTECTING BASIC INPUT/OUTPUT (BIOS) CODE

CLAIM FOR PRIORITY

The present application is a national stage filing under 35 U.S.C. § 371 of PCT application number PCT/US2016/014774, having an international filing date of Jan. 25, 2016, the disclosure of which is hereby incorporated by reference in its entirety.

BACKGROUND

Computing devices include a basic input/output system (BIOS) that may be stored, for example, on flash memory associated with a central processing unit (CPU). This has the advantage that the BIOS may be changed or updated as a BIOS manufacturer releases new versions of the BIOS code. Access to the flash BIOS may be made via general purpose input/output (GPIO) lines of an input/output (I/O) controller hub. In one example, one of the GPIO lines may be connected to a write enable/disable pin of the flash BIOS and may be used to allow a write process to the flash BIOS.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

While access to the BIOS for updating purposes is desirable to allow a computer device to use the most recent BIOS code provided by a manufacturer, this level of access may allow access to the BIOS by computer viruses designed to corrupt the BIOS code stored on the flash memory. Any such corruption is undesirable as it may render the computer system unusable. Thus, BIOS code may be the subject of attacks by malware in the computing system or from an external service. As a result of an attack, the BIOS code may become compromised.

Associated with the BIOS is system management mode (SMM); an operating mode provided for handling system-wide functions like power management, system hardware control, or proprietary original equipment manufacturer (OEM) designed code of a computing system. The SMM is intended for use by system firmware, and not by application software or general-purpose systems software such as an operating system. The SMM offers a distinct and easily isolated processor environment that operates transparently to the operating system or executive and software applications. In order to achieve transparency, SMM imposes a number of rules. The SMM is entered through system management interrupt (SMI). The processor executes the SMM code in a separate address space that is made inaccessible to other operating modes of the CPU by the firmware. Thus, the SMM is an operating mode of the CPU in which all normal execution, including the operating system, is suspended and special separate software, which may be part of the firmware or a hardware-assisted debugger, is executed with high privileges.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
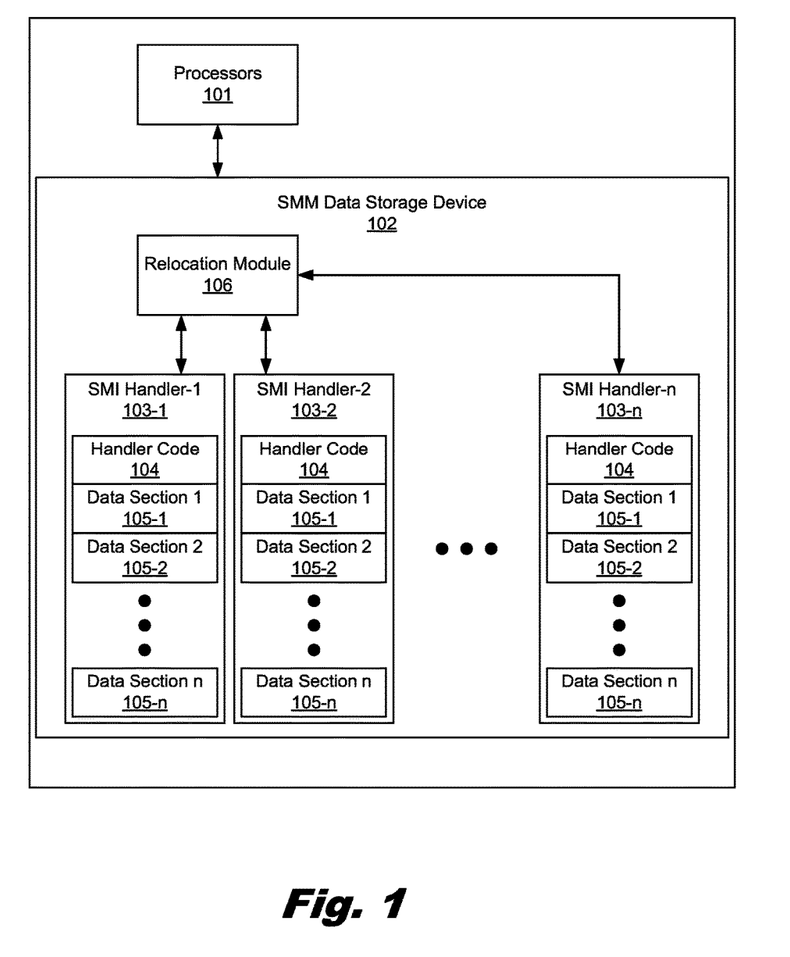
FIG. 1 is a block diagram of a system for relocating data sections of a number of system management interrupt (SMI) handlers of runtime basic input/output system (BIOS) code, according to one example of the principles described herein.

Turning now to the figures, FIG. 1 is a block diagram of a system for relocating data sections of a number of system management interrupt (SMI) handlers of runtime basic input/output system (BIOS) code, according to one example of the principles described herein. The system (100) may be implemented in an electronic device. Examples of electronic devices include servers, desktop computers, laptop computers, personal digital assistants (PDAs), mobile devices, smartphones, gaming systems, and tablets, among other electronic devices.

To achieve its desired functionality, the system (100) includes various hardware components. Among these hardware components may be a number of processors (101), and a number of data storage devices (102). In one example, the data storage devices include a system management mode (SMM) data storage device to store data and executable code associated with an SMM. These hardware components may be interconnected through the use of a number of busses and/or network connections.

The processor (101) may include the hardware architecture to retrieve executable code from the SMM data storage device (102) and execute the executable code. The executable code may, when executed by the processor (101), cause the processor (101) to implement at least the functionality of protecting basic input/output (BIOS) code by executing a relocation information tool to relocate dynamic data of a number of system management interrupt (SMI) handlers that may change at runtime of the BIOS, to relocate static code and static data of the SMI handlers, or combinations thereof. This is done to segregate the dynamic data from the static elements of the SMI handlers (i.e., static code and static data) in order to protect the static elements from alterations at runtime, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of modules, handlers, and applications that the processor (101) executes to implement at least the functionality described herein.

The data storage device (102) may include various types of memory modules, including nonvolatile memory. For example, the data storage device (102) of the present example includes, for example, Random Access Memory (RAM). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM), maintain nonvolatile storage in the Hard Disk Drive (HDD) memory, and execute program code stored in Random Access Memory (RAM).

Generally, the data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The system (100) further includes a number of modules used in the implementation of protecting basic input/output (BIOS) code by relocating static code and data of a number of system management interrupt (SMI) handlers. The various modules within the system (100) include executable program code that may be executed separately. In this example, the various modules may be stored as separate computer program products. In another example, the various modules within the system (100) may be combined within a number of computer program products; each computer program product comprising a number of the modules.

The system (100) may include, for example, a relocation information tool (110) to, when executed by the processor (101), identify dynamic data within a number of handlers of the BIOS code. The relocation information tool (110) also identifies static data and static code that are to remain unaltered and protected for and during runtime of the BIOS. The relocation information tool (106) refactors a number of data sections (105) within a number of handlers (103) of the BIOS code to tag a number of dynamic variables within the SMI handlers (103) for relocation within the storage space of the SMI handlers (103). Further, the relocation information tool (106) refactors the data sections (105) within the handlers (103) to tag a number of variables as static variables that should not change and should be protected for that reason, tag a number of variables within the SMI handlers (103) as dynamic variables that may change at runtime of the BIOS, or a combination thereof. The tags indicate which of the variables should be protected at runtime to ensure that changes to the protected variables are not made. All static variables along with the static handler code (104) should be protected at runtime. The relocation information tool (106) generates a relocation file comprising a number of relocation addresses identifying locations of a number of dynamic variables that may change at runtime. The relocation addresses point to a location within the handlers (103) different from an original location of the protected variables within the data sections of the handlers. Further, a loader loads the relocation file at runtime as part of a BIOS firmware image and adjusts data access to the dynamic variables in the handler code to identify the location of the dynamic variables based on the relocation file. More details regarding the code and data stored on the handlers will now be described in more detail.

As used in the present specification and in the appended claims, the term "handler" is meant to be understood broadly as any software routine that controls a program's reaction to specific external events. In one example described herein, a handler controls the system's (100) reaction to a system management interrupt (SMI), and, therefore, may be referred to as an interrupt handler. Thus, a handler may be described as a callback function in microcontroller firmware, an operating system or a device driver, whose execution is triggered by the reception of an interrupt.

The system (100) utilizes the SMI that causes the processors (101) to enter a protected operating environment in which the execution of all software is halted but for code contained within the protected environment. The code within the protected environment includes, for example, BIOS code. The BIOS is a type of firmware used to perform hardware initialization during the booting process (power-on startup), and to provide runtime services for operating systems and programs. The BIOS firmware is built into computing devices, and is the first software they run when powered on. One purpose of the BIOS in computing devices is to initialize and test the system hardware components, and to load a boot loader or an operating system from a mass memory device such as the SMM data storage device (102). The BIOS additionally provides an abstraction layer for the hardware to provide a consistent way for application programs and operating systems to interact with the keyboard, display, and other input/output (I/O) devices. In one example, the BIOS code may be stored in a ROM chip on the system's (100) motherboard. In another example depicted throughout the figures, the BIOS and associated code and data is stored on flash memory so it can be rewritten without removing the chip from the motherboard. This allows easy updates to the BIOS firmware to add new features and fix problems with the BIOS.

The SMI handlers (103) may be executed during a power on of the system (100), during an interrupt event such as, for example, the overheating of a hardware component within the system (100), or combinations thereof. In these instances, the system (100) may enter system management mode (SMM). As mentioned above, SMM is an operating mode provided for handling system-wide functions like power management, system hardware control, or proprietary original equipment manufacturer (OEM) designed code of the system (100). The SMM is entered through SMI, where the processors (101) execute the SMM code in a separate address space that is made inaccessible to other operating modes of the CPU by the firmware. Thus, the SMM is an operating mode of the CPU in which all normal execution, including the operating system, is suspended and special separate software, which may be part of the firmware or a hardware-assisted debugger, is executed with high privileges.

Any number of SMI handlers (103) may be stored in the SMM data storage device (102) as indicted by SMI handler 1 (103-1) through SMI handler n (103-n) depicted in FIG. 1. Each SMI handler (103) may include handler code (104) that, when executed, addresses an SMI event. The SMI handlers (103) also include a number of data sections (105). The number of data sections (105) within an SMI handler (103) may vary among the SMI handlers (103), but may include any number of data sections (105) as indicated in FIG. 1 with reference to data section 1 (105-1) through data section n (105-n). However, an SMI handler (103) within the SMM storage data (102) may be compromised as a result of an attack by malware or other attacks from outside the BIOS system. In one example, the handler code (104), data sections (105), or a combination thereof, may be written to or otherwise altered by an outside source, and the system (100) may be compromised. Because of the highly privileged nature of the BIOS and the SMM, such an attack may potentially allow the outside source to gain access to any portion of the system (100) (i.e., a user's computing device) and any of its functions and data. Thus, examples described herein provide protection to the handler code (104), data sections (105), or combinations thereof within the SMI handlers (103) from alterations before and during runtime of the BIOS and SMM.

Figure 2:
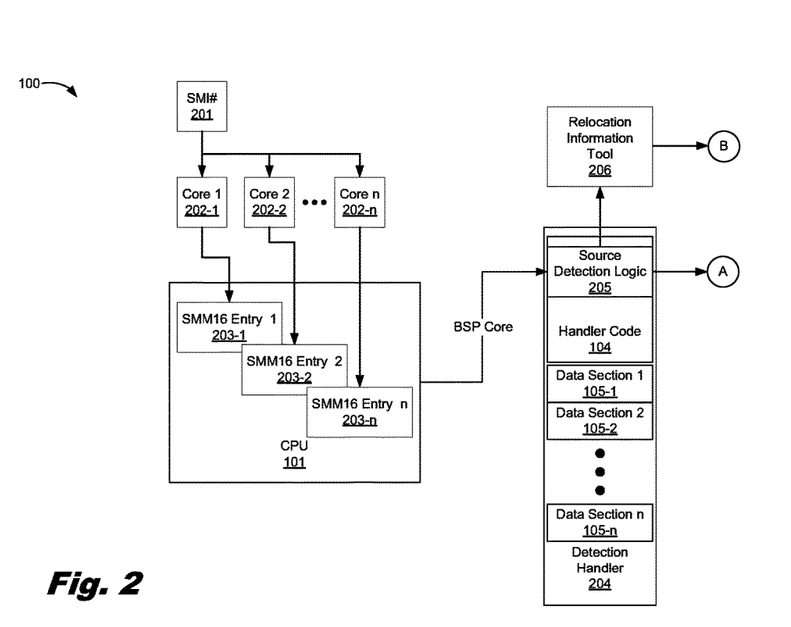
FIGS. 2 and 3 are a data flow chart of a method of protecting basic input/output system (BIOS) code, according to one example of the principles described herein.
Figure 3:
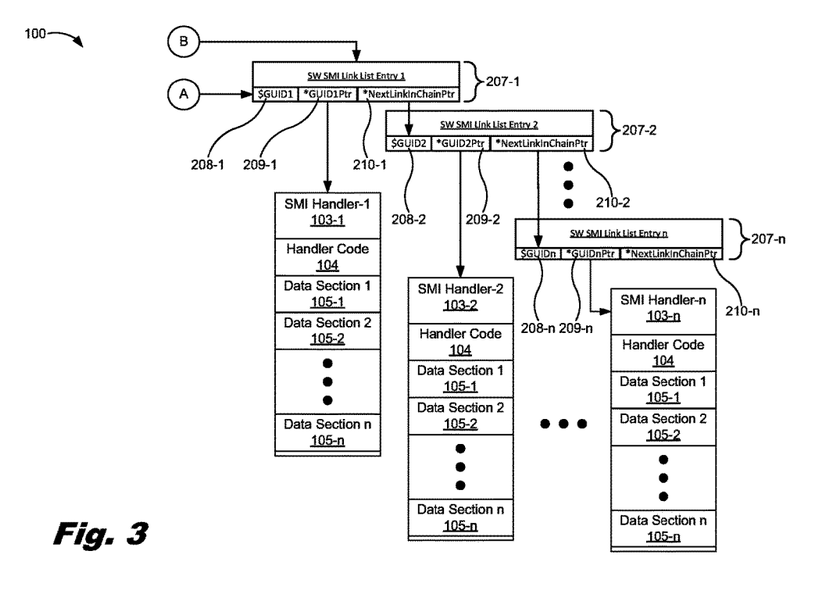

Evocation of an SMI event and the protection of the handler code (104) and data sections (105) may be performed as the system (100) enters an SMM. FIGS. 2 and 3 are a data flow chart of a method of protecting basic input/output system (BIOS) code, according to one example of the principles described herein. As depicted in FIG. 2, an SMI event (201) occurs. Once this SMI event (201) is evoked, a number of cores (202) (i.e., processors (FIG. 1, 101)) within a central processing unit (CPU) (101) enter an SMM state (203). One of the cores (202) is chosen as the bootstrap processor (BSP) core (202) in order to start-up the computing device (100).

In the example depicted in FIG. 2, a detection handler (204) is executed as the first or one of the first handlers executed by the BSP core (202). The detection handler (204) includes handler code (104) and a number of data sections (105). The handler code (104) of the detection handler (204) includes source detection logic (205).

The source detection logic (205) determines the source or cause of the SMI event, and provides executable code that causes the BSP core (202) to begin searching through a number of link lists (FIG. 3, 207) to determine which of a number of SMI (201) were executed. Following data flow indicator "A," and as depicted in FIG. 3, any number of link list entries (207) may be included within the BIOS as indicated by link list entry (207-1) through link list entry (207-n). During the search, the BSP core (202) searches for a match between a globally unique identifier (GUID) found in the SMI and a GUID (208) identified in each of the link lists entries (207). Once a match between the GUID (208) and the SMI event (201) is found, the GUID pointer (209-1) points to the SMI handler (103) associated with that GUID (208), and executes the handler code (104) contained therein to address the SMI event (201). If a match between the GUID (208) and the SMI event (201) is not found in connection with a particular link list entry (207), then that link list entry (207) uses a next-link-in-chain pointer (210) to point to a subsequent link list entry (207), and the comparison between the GUID found in the SMI event (201) as detected by the source detection logic (205) and the GUID (208) of the next link list entry (207). In this manner, handler code (104) is executed in response to the SMI event (201) to handle the SMI event (201).

The source detection logic (205) also causes the BSP core (202) to execute a relocation information tool (206) before, during, and/or after the link lists (207) are searched as described above. The relocation information tool protects the BIOS code by relocating dynamic code, or static code and static data, or a combination thereof of a number of the SMI handlers (103) to other portions within the data sections (105). In one example, either the dynamic data, or the static code and static data are relocated, but not both. In this example, the movement of both groups of data may prove inefficient since another process is executed. By moving only one group, the overall process is shortened and less computing resources are consumed. However, in another example, both the dynamic data, and the static code and static data are moved and segregated such that the dynamic data is stored in a dynamic heap within the storage space of the SMI handler (103) and the static code and static data are stored in a static heap within the storage space of the SMI handler (103).

The relocation information tool (206) itself may be stored in any portion of the SMM data storage device (102), and may be stored as a stand-alone file or as one of the SMI handlers (103) to be executed at the outset of entry to the SMM. Following data flow indicator "B," and as depicted in FIG. 3 the relocation information tool (206) may access the SMI handlers (103) by accessing their respective list link entries (207). In another example, the relocation information tool (206) may access the SMI handlers (103) directly. In either example, the relocation information tool (206) accesses the SMI handlers (103) to refactor the handlers (103) including the handler code (104) and static data portions within the data sections (105) that should be protected and relocated to a separate data section (105) within the SMI handlers (103).

As used in the present specification and in the appended claims, the term "refactor" is meant to be understood broadly as any act of making changes across a set of data without changing the behavior of the handler or its relationships to other elements. In one example, the refactoring of the handlers (103) includes tagging a number of variables within the handler code (104) and data sections (105) that should be protected because they should not change at or after runtime of the BIOS.

Further, as used in the present specification and in the appended claims, the term "dynamic data" is meant to be understood broadly as any data that, in programming languages, pertains to properties that are established during the execution of a program and pertains to events that occur at run time or during processing. For example, dynamic data may include a variable that is used during runtime execution of a program. As used in the present specification and in the appended claims, the term "static data" is meant to be understood broadly as any data that, in programming languages, retains its value between function calls. For example, static data may include any data that, once initialization of boot time occurs, should not change. An example of static data within a BIOS includes a function pointer.

The data sections (105) within the SMI handlers (103) each contain dynamic data, static data, or a combination thereof. Further, the handler code (104) is treated as a static element within the handler (103), should not change once initialization of boot time occurs, and, for this reason, should be protected along with the static data. In order to more fully understand the method by which the relocation information tool (206) protects portions of the handlers (103) reference will now be made to FIGS. 4 and 5.

Figure 4:
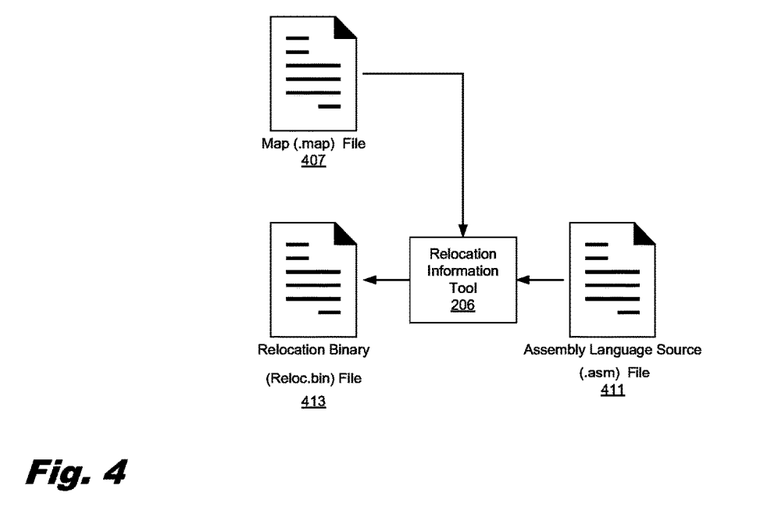
FIG. 4 is a data flow chart of a method of generating a relocation file, according to one example of the principles described herein.

FIG. 4 is a data flow chart of a method of generating a relocation file (413), according to one example of the principles described herein. In protecting the BIOS code of the system (100), the BSP core (202) executes the relocation information tool (206) to generate a relocation file (413) based on a MAP (.map) file (407) and an assembly language (ASM) source file (411).

The relocation file (413) is a binary (.bin) file that is loaded with a loader at runtime as part of a BIOS firmware image. A binary file is any file that stores raw sector-by-sector copies of data within memory. In one example, the relocation file (413) includes a number of driver names associated with each of the handlers (103), a driver global unique identifier (GUID) associated with each of the driver names, and a number of relocation records identifying relocation addresses defining locations of a number of variables to be protected. The relocation addresses point to a location within a number of handlers different from an original location. More detail regarding the generation of the relocation file (413) will now be provided in connection with FIG. 5.

Figure 5:
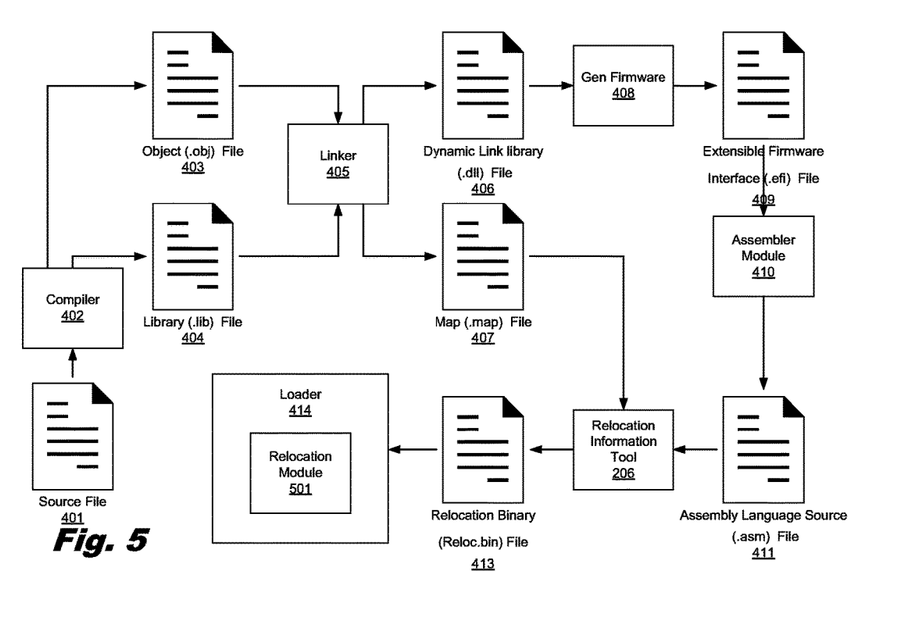
FIG. 5 is a data flow chart of a method of generating a relocation file, according to another example of the principles described herein.

FIG. 5 is a data flow chart of a method of generating a relocation file (413), according to another example of the principles described herein. The method of FIG. 5 may begin by compiling, with a compiler (402), a source file. In one example, the source file is written in a type of C programming language. The compiler (402) generates an object (.obj) file (403) and a library (.lib) file (404). An object file (403) is any file containing object code or any other type of relocatable format machine code. Relocation is the process of assigning load addresses to various parts of a program and adjusting the code and data in the program to reflect the assigned addresses. A library file (404) includes a set of routines, external functions, and variables that are resolved at compile-time and copied into a target application by a compiler, linker, or binder.

A linker (405) is any computer program that takes the object file (403) and the library file (404) generated by the compiler (402), and combines them to create a dynamic link library (DLL) (.dll) file (406) and the MAP file (407). A DLL file (406) is any file that includes executable code and data bound to a program at load time or run time, rather than during linking.

The MAP file is any file that informs the relocation tool where within the binary source file such as the DLL file (406) and the assembly language (ASM) source file (411) where a number of symbols that identify variables are located in the SMM data storage device (102). These variables are identified as being either dynamic data that may change at runtime or as static data that should not change at runtime. The number of dynamic variables within the SMI handlers (103) are tagged by the relocation information tool (206) within the source code to indicate that they are dynamic data that may change at runtime of the BIOS. In one example, the relocation information tool (206) may further tag static data as data that should not change at the end of the boot process, and should be protected for that reason.

A generator (GenFW) (408) changes the format of the DLL file (406), a binary format file, into a unified extensible firmware interface (UEFI) or extensible firmware interface (EFI) formatted file (409). Once the binary EFI file (409) is obtained, the relocation information tool (206) within the system (100) uses the MAP file (407) and an assembler module (410) to identify the tags within the SMI handlers (103) and parses the data sections (105) section-by-section to find those tags. A section is a page of data where a page is 4,096 bytes. Some of the data sections (105) may include all dynamic data that includes variables that constantly change even during and after runtime. This dynamic data is not protected. However, some data sections (105) include either a mixture of dynamic and static data, or all static data that should be protected from being changed at and after runtime. Thus, the relocation information tool (206) is able to search at the granularity of a page or data section (105) to find those data sections (105) that include either a mixture of dynamic and static data, or all static data. These sections are marked as protected from change. This level of granularity allows for relatively fewer data sections (105) to be moved. Further, the system (100), in one example, may place the protected variables in the SMM data storage device (102) within the boundaries set by the size of a page in order to conserve storage space.

All of the handler code sections (104) are deemed as static, and are marked by the relocation information tool (206) as being protected along with the data sections (105) that include either a mixture of dynamic and static data, or all static data. The relocation information tool (206) aggregates the code sections (104) and the data sections (105) that include either a mixture of dynamic and static data, or all static data, and allocates space within the SMM data storage device (102) for their storage.

Figure 6:
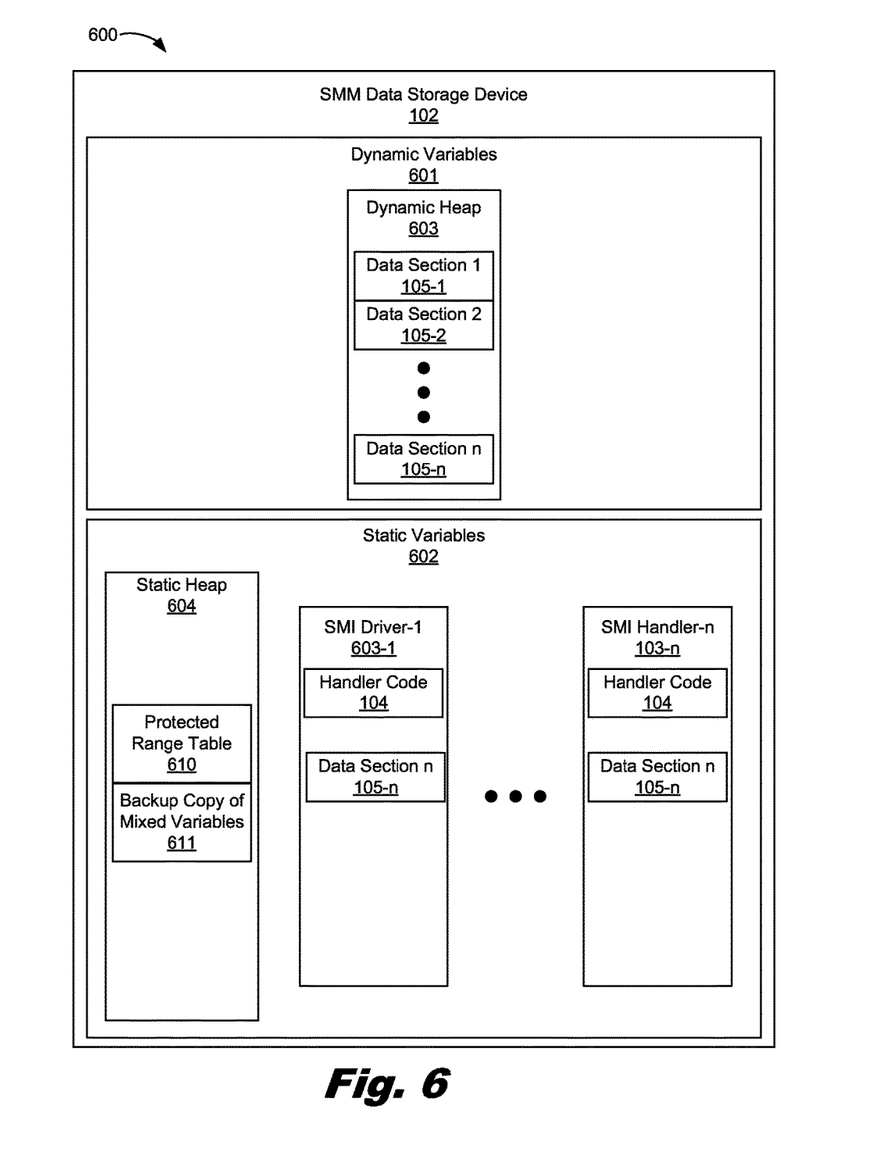
FIG. 6 is a system management mode (SMM) memory map, according to one example of the principles described herein.

In allocating space within the SMM data storage device (102) for the storage of the handler code (104) and the data sections (105) that include either a mixture of dynamic and static data or all static data, the relocation information tool (206) creates heaps or areas within the SMM data storage device (102) where the dynamic data sections are segregated from the handler code (104) and the data sections (105) that include either a mixture of dynamic and static data or all static data. FIG. 6 is a system management mode (SMM) memory map (600), according to one example of the principles described herein. The SMM memory map (600) is used by the relocation information tool (206) of the system (100) to create an area within the SMM data storage device (102) for the dynamic variables (601) segregated from the static variables (602). The dynamic heap (603) allocated within the SMM data storage device (102) includes data sections (105) that include only dynamic data. The dynamic data, due to their tagging as such by the relocation information tool (206), are physically relocated to the dynamic heap. The dynamic heap is an allocated area of data storage separate from an original data storage area or location where the dynamic variables were previously stored. As mentioned above, both dynamic (i.e., dynamic data) and static elements (i.e., static code and static variables) may be moved to segregated areas of the SMI handler (103). However, in this example, only the dynamic data is physically moved to an allocated storage space in order to reduce or eliminate processing and use of computer resources.

The static heap (604), in contrast, includes a protected range table (610) and a backup copy of mixed variables (611). The protected range table (610) is built by the relocation information tool or a periodical scan module stored in the SMM data storage device (102) to list ranges within the SMM data storage device (102) that contain protected static code and data. The table may take a form similar to the following runtime protection table:

TABLE 1

Runtime Protection Table

| Action | Dynamic | Static | Mixed |
|---|---|---|---|
| Global | No action | Tagging | Note below* |
| Local | No action | Tagging | Note below* |
| Allocation from Heap | No action | New allocation function | Note below* |

*It is noted that a new function may be called to add entries, with source address, destination address and size, into the runtime protection table.

In one example, the processor (101) instructs each handler to identify a number of critical portions of the data sections (105) within the handlers (103) that contain both static and dynamic members. The processor (101) may create a list of protected ranges in a runtime protection table and a static copy of the handlers (103) for the periodical scan module.

Globally and locally speaking, no action is taken for dynamic data. Further, no action is taken for dynamic data with regard to allocation of space within the dynamic heap of the SMM data storage device (102). In contrast, globally and locally, the static code and data is tagged, and the above-described identification of protected ranges takes place in connection with the static code and static data. In one example, a new function may be called by the relocation information tool (206) for the data sections (105) that include either a mixture of dynamic and static data or all static data to add entries, with source addresses, destination addresses, and sizes of the static and mixed data sections (105). This information is entered into the protected range table (610).

As mentioned above, a backup copy of the mixed variables (611) is also maintained in the static heap (604) of the static variables (602) portion of the SMM data storage device (102). This allows the relocation information tool (206) of the system (100) to provide a copy of one or more handler code sections (104) or static data sections (105) in order to verify the active copy does not include a change in critical data with respect to the backup copy (611).

In one example, a computer module to periodically scan the handlers (103) may be used to verify that critical data within the handlers (103) that contain both static and dynamic elements have not been altered. This verification of protected data within the range is executed as early as possible after the entry point of the SMM in order to consistently maintain a correct copy of this critical data. Further, the relocation information tool (206) may periodically verify an active copy of data among the dynamic variables (601) against the backup copy of the mixed variables (611) among the static variables (602) in order to ensure that the static data that is mixed with dynamic data within the static variables (602) section of the SMM data storage device (102) are protected from change.

The static variables (602) within the SMM data storage device (102) also include handler code (104) and those data sections (105) that include either a mixture of dynamic and static data or all static data. The relocation information tool (206) alters the existing loader to support section-level relocation of dynamic data and global relocation of handler code (104) within the SMI handlers (103). In one example, the loader is a portable executable/common object file format (PE/COFF) loader. The relocation information tool (206) also alters the loader to ensure that the loader skips relocation in order to avoid conflicts between data relocation processes.

Turning again to FIG. 5, the assembler module (410) takes as input the EFI file (409) and creates an assembly language source (ASM) (.asm) file (411). Thus, the assembler module (410) produces .asm files, and is a computer program that converts assembly language instructions into object code. Assembly language allows for the defining and use of symbols to represent hardware memory addresses, architectural features such as processor registers, and constant values. A symbol called a mnemonic may be used to specify each low-level machine instruction or operation. In one example, one or more operands are provided within the assembly language (ASM) source file (411) in order to form a complete instruction. Further, in one example, the assembler module (410) allow symbols, constants, and expressions as operands.

As described herein, the relocation information tool (206) scans the MAP file (407) to identify all symbols that identify variables that will be referenced by handler code (104). For each symbol, the relocation information tool (206) searches through the ASM file (411) generated by the assembler module (410) using a disassembler. A disassembler is any computer program that translates machine language into assembly language; the inverse operation to that of an assembler. For each line with those identified symbols, based on an operation code (opcode), the relocation information tool (206) determines the offset that is to be adjusted at load time. Still further, the relocation information tool (206) generates the relocation binary (reloc.bin) file (413).

The relocation information tool (206) takes as input the MAP file (407) and the ASM file (411), and generates a relocation binary (reloc.bin) file (413). The MAP file (407) informs the relocation information tool (206) where within the binary ASM source file (411) where the variables and their symbols are located. These variables were tagged within the source code to indicate that they are dynamic variables that may change at runtime of the BIOS, static data and should not change at the end of the boot process, or combinations thereof.

The relocation binary file (413) is loaded at runtime by the loader (414) as part of the BIOS firmware image. The relocation module (501), during the loading of the BIOS image and at runtime, alters the handler code (104) to include new addresses for the dynamic data. As described above, the dynamic data is relocated within the handler (103) and segregated from the static code (104) and the static data within the data sections (105). Thus, in order to properly address, locate, and execute the relocated dynamic data, the handler code (104) is amended to include the new data locations of the dynamic data. In this manner, the relocation information identifying the allocation of memory space within the SMM data storage device (102) and the locations and addresses of the segregated code and data are provided at runtime by the loader via the relocation module (501). Further, because of this, a number of page tables, the libraries within generic EFI modules, and an SMM protocol database are also protected.

In this manner, the various components of the system (100) provide for (1) the tagging of all dynamic data, and, separately, static data with section attributes so that the dynamic data will be stored in the same data section (105) during the build process and segregated from the static elements; (2) the building a list of protected ranges of the static code and static data and periodically verifying an active copy of data in the dynamic area of the SMM data storage device (102) against a backup copy (611) located in the static area of the SMM data storage device (102) in order to protect those static members of structure that are mixed with dynamic members; and (3) modifying the BIOS build process to generate relocation information, among others. Section-level relocation support is added such that all SMM drivers will load to the static area (602) of the SMM data storage device (102). The loader (e.g. PE/COFF loader) is modified to allocate memory in the dynamic area (601), copy sections with dynamic data to the new location, and adjust all the data access in the code sections (104) to the new location. In this manner, an SMM driver image remains intact to avoid impact to loaded image protocol but dynamic data section will have no effect on the loaded image. Further, the memory allocation functions are added to allocate memory for dynamic data in the SMI handlers (103). In one example, the memory allocation may come from a portion of the memory allocated as the static data area (602).

In one example, the BIOS build may utilize any type of compiler (402) may be used including a GNU C compiler developed and distributed by the Free Software Foundation, a Clang compiler developed and distributed under a University of Illinois/NCSA Open Source License. Further, in one example, the linker (405) may be any UNIX linker developed and distributed under an open source license.

Figure 7:
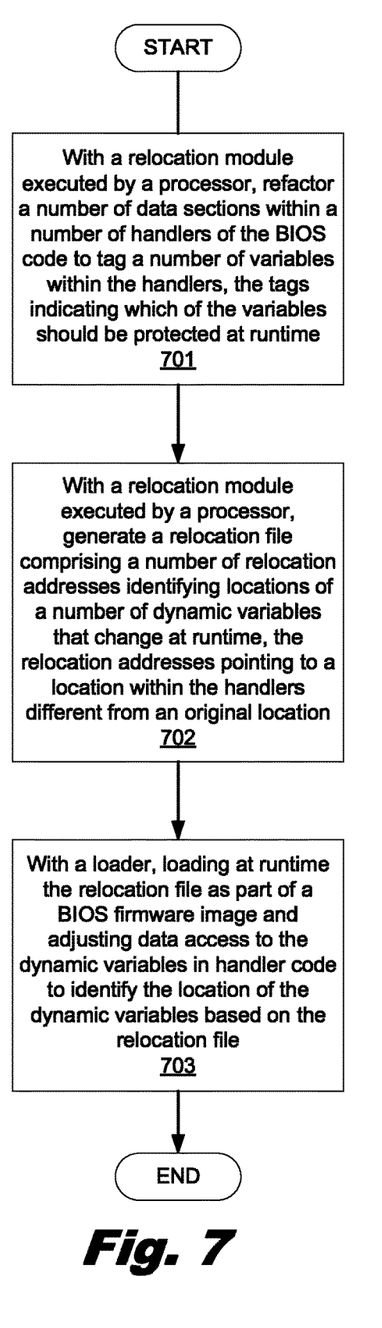
FIG. 7 is a flowchart depicting a method of protecting BIOS code, according to one example of the principles described herein.

FIG. 7 is a flowchart depicting a method of protecting BIOS code, according to one example of the principles described herein. The method includes, with a relocation information tool executed by a processor, refactoring (block 701) a number of data sections (105) within a number of handlers (103) of the BIOS code to tag a number of variables within the handlers (103). Refactoring is the process of restructuring the existing handler code (104) (i.e., changing the factoring) without changing the handler code's (104) external behavior. The tags indicate which of the variables are to be protected at runtime.

The method further includes generating (block 702) a relocation file (413) including a number of relocation addresses identifying locations of a number of dynamic variables that may change at runtime. The relocation addresses point to a location within the handlers (103) different from an original location. That is to say, due to the relocation of data sections (105) within the SMM data storage device (102), the addresses within the SMM data storage device (102) are changed and stored to allow the system (100) to find the relocated data sections (105).

A loader loads (block 703), at runtime, the relocation file (413) as part of a BIOS firmware image and adjusting data access to the dynamic variables in handler code to identify the location of the dynamic variables based on the relocation file. The relocation file (413) includes, for example, a number of handler names associated with each handler (103), and a driver global unique identifier (GUID) (208) associated with each of the handler names.

In one example, the method further includes identifying handler code (104) of the handlers (103), aggregating the handler code (104) and protected variables (i.e., static and mixed dynamic and static data sections (105)), and relocating the handler code (104) and the protected variables (105) to a data heap (602, 604) within a system maintenance mode (SMM) data storage device (102). The relocation addresses identify locations of the handler code (104) and the protected variables (105).

In one example, the method further includes, with the relocation information tool (206), verifying that no critical data has been altered through the relocation. Further, in one example, the method further includes instructing each handler (103) to identify the handler code (104) and the protected variables (105) based on the relocation addresses in a runtime protection table. Relocating the dynamic variables (601) to a data heap (603) includes allocating memory within the SMM data storage device (102) for a number of handlers (103) that include the dynamic variables (601). The handler code (104) and the protected variables (105) are stored in the same section of the handler (103) during a build process of the BIOS code segregated from the dynamic heap (603).

In one example, the method further includes modifying the loader to allocate memory within the SMM data storage device (102) as a static area (602) of the SMM data storage device (102) where the handler code (104) and the protected variables (103) are stored. In this example, the method may further include changing data access in the handler code (104) to include the relocation addresses.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processors (101) of the system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a methods and systems of protecting basic input/output system (BIOS) code. The method includes, with a relocation information tool executed by a processor, refactoring a number of data sections within a number of handlers of the BIOS code to tag a number of variables within the handlers. The tags indicate which of the variables should be protected at runtime. The method further includes generating a relocation file comprising a number of relocation addresses identifying locations of a number of dynamic variables that change at runtime. The relocation addresses point to a location within the handlers different from an original location. The method further includes, with a loader, loading at runtime the relocation file as part of a BIOS firmware image and adjusting data access to the dynamic variables in handler code to identify the location of the dynamic variables based on the relocation file. These methods and systems: (1) ensures the integrity of runtime BIOS code that includes SMM and UEFI runtime services; and (2) apply to any computing platform, among others.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of protecting basic input/output system (BIOS) code comprising: with a relocation information tool executed by a processor:
refactoring a number of data sections within a number of interrupt handlers of the BIOS code to identify dynamic variables and static variables within the interrupt handlers of the BIOS code, wherein the dynamic variables change during runtime of the BIOS code and the static variables are unchanged and to be protected during the runtime of the BIOS code;
tagging the dynamic variables of the interrupt handlers of the BIOS code for relocation within storage space of the interrupt handlers;
tagging the static variables of the interrupt handlers of the BIOS code to be protected;
segregating the dynamic variables from the static variables by relocating the dynamic data to new locations within the storage space of the interrupt handlers;
generating a relocation file comprising a number of relocation addresses identifying the new locations of the dynamic variables; and
loading at the runtime the relocation file as part of a BIOS firmware image and adjusting data access to the dynamic variables in handler code to identify the location of the dynamic variables based on the relocation file.

2. The method of claim 1, wherein the relocation file further comprises:
a number of handler names associated with each of the interrupt handlers, and a driver global unique identifier (GUID) associated with each of the handler names.

3. The method of claim 1, further comprising:
identifying handler code of the interrupt handlers;
aggregating the handler code and the protected static variables; and
relocating the dynamic variables to a data heap within a system maintenance mode (SMM) data storage device, the relocation addresses identifying the new locations in the handler code for access to the dynamic variables.

4. The method of claim 3, further comprising, with a periodical scan module, verifying that data within the interrupt handlers that contain both static and dynamic members has not been altered.

5. The method of claim 4, further comprising instructing each of the interrupt handlers to identify a number of portions of the data sections within the interrupt handlers that contain both the static and dynamic members, and create a list of protected ranges and a static copy of the interrupt handlers in a runtime protection table for the periodical scan module.

6. The method of claim 3, wherein relocating the dynamic variables to a data heap comprises:
allocating memory within the SMM data storage device for a number of the interrupt handlers that include the dynamic variables.

7. The method of claim 3, wherein the handler code and the protected static variables are stored in the same section of the interrupt handlers during a build process of the BIOS code.

8. The method of claim 3, further comprising modifying the loader to:
allocate memory within the SMM data storage device as a static area of the SMM data storage device where the handler code and the protected static variables are stored;
change data access in the handler code to include the relocation addresses.

9. A system comprising:
a processor; and
a memory storing instructions that are executable to cause the processor to:
refactor a number of data sections within a number of interrupt handlers of the BIOS code to identify dynamic variables and static variables within the interrupt handlers of the BIOS code, wherein the dynamic variables change during runtime of the BIOS code and the static variables are unchanged and to be protected during the runtime of the BIOS code;
tag the dynamic variables of the interrupt handlers of the BIOS code for relocation within storage space of the interrupt handlers;
tag the static variables of the interrupt handlers of the BIOS code to be protected;
segregate the dynamic variables from the static variables by relocating the dynamic data to new locations within the storage space of the interrupt handlers;
generate a relocation file comprising a number of relocation addresses identifying the new locations of the dynamic variables; and
load at the runtime the relocation file as part of a BIOS firmware image and adjusting data access to the dynamic variables in handler code to identify the location of the dynamic variables based on the relocation file.

10. The system of claim 9, wherein the relocation file further comprises a number of handler names associated with each of the interrupt handlers, and a driver global unique identifier (GUID) associated with each of the handler names.

11. The system of claim 9, wherein the instructions are executable to cause the processor to:
identify handler code of the interrupt handlers;
aggregate the handler code and the protected static variables; and
relocate the dynamic variables to a data heap within a system maintenance mode (SMM) data storage device, the relocation addresses identifying the new locations in the handler code for access to the dynamic variables.

12. The system of claim 9, wherein the instructions are executable to cause the processor to:
instruct each of the interrupt handlers to identify portions of the data sections within the interrupt handlers that contain both static and dynamic data that has not been altered, and
create a list of protected ranges and a static copy of the interrupt handlers in a runtime protection table.

13. A non-transitory computer readable medium storing instructions that when executed by a processor cause the processor to:
refactor a number of data sections within a number of interrupt handlers of the BIOS code to identify dynamic variables and static variables within the interrupt handlers of the BIOS code, wherein the dynamic variables change during runtime of the BIOS code and the static variables are unchanged and to be protected during the runtime of the BIOS code;
tag the dynamic variables of the interrupt handlers of the BIOS code for relocation within storage space of the interrupt handlers;

tag the static variables of the interrupt handlers of the BIOS code to be protected;

segregate the dynamic variables from the static variables by relocating the dynamic data to new locations within the storage space of the interrupt handlers;

generate a relocation file comprising a number of relocation addresses identifying the new locations of the dynamic variables; and load at the runtime the relocation file as part of a BIOS firmware image and adjusting data access to the dynamic variables in handler code to identify the location of the dynamic variables based on the relocation file.

14. The non-transitory computer readable medium of claim 13, wherein the relocation file further comprises a number of handler names associated with each of the interrupt handlers, and a driver global unique identifier (GUID) associated with each of the handler names.

15. The non-transitory computer readable medium of claim 13, wherein the instructions are executable to cause the processor to:

identify handler code of the interrupt handlers;

aggregate the handler code and the protected static variables; and relocate the dynamic variables to a data heap within a system maintenance mode (SMM) data storage device, the relocation addresses identifying the new locations in the handler code for access to the dynamic variables.

16. The non-transitory computer readable medium of claim 13, wherein the instructions are executable to cause the processor to:

instruct each of the interrupt handlers to identify portions of the data sections within the interrupt handlers that contain both static and dynamic data that has not been altered, and create a list of protected ranges and a static copy of the interrupt handlers in a runtime protection table.

* * * * *